Figure 1:
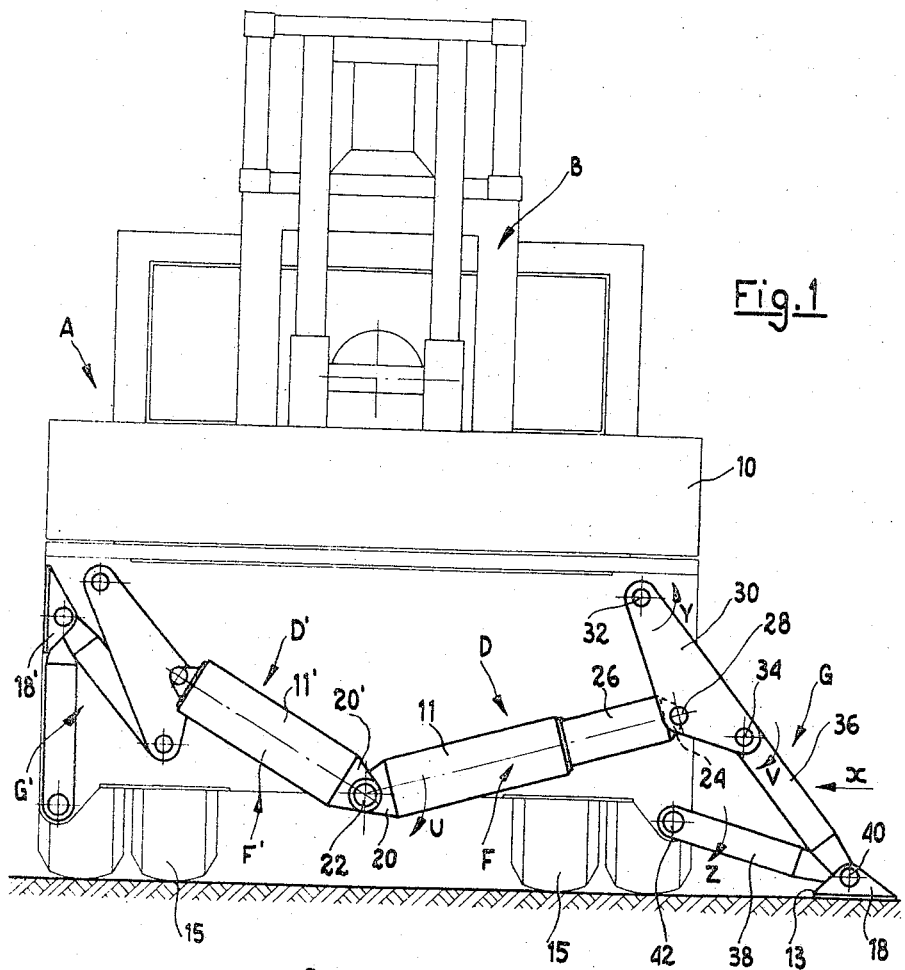

INVENTOR.
Guido TESTORE
BY McGlew and Toren
ATTORNEYS

United States Patent Office 3,337,063
Patented Aug. 22, 1967

3,337,063
HYDRAULICALLY CONTROLLED LINKWORK STABILIZER FOR TRUCK CRANES OR THE LIKE
Guido Testore, Via Duchessa di Galliera, Ovada, Italy
Filed Oct. 11, 1965, Ser. No. 494,419
4 Claims. (Cl. 212—145)

This invention relates to a hydraulically controlled stabilizer linkage, for truck cranes or the like.

As is well known, to keep a truck crane or the like properly stabilized in the course of handling, where the side tilting moment caused by the loads that are being lifted or lowered would prejudice the stability of truck, with possible danger of overturning, recourse is made to hand-, or hydraulically controlled stabilizers. These usually comprise cross beams, which are drawn out of suitable seats from the truck side wherein the tilting moment is exerted, and are fitted with legs or feet, through which they are caused to rest firmly on the ground. Such already known stabilizer means are heavy and difficult to handle and to bring into action. Moreover, the time taken for having the truck equipped with such stabilizers is relatively long, and tools are usually needed to firmly secure the stabilizers in the required position.

Moreover, the reliability and safety of the already known stabilizers never are very high.

This invention is intended to obviate the abovestated and further drawbacks by the provision of a stabilizer with which truck cranes or the like can be fitted, such stabilizer being characterized in that it comprises a suitable hydraulic control, that can be operated directly by the driver, and a linkage that is acted upon by said control, and which carries a suitably located member by which the bearing on the ground is ensured whereby, upon operating said hydraulic control in a given direction, the linkage is expanded, and said supporting member is brought outwardly, while, when the control is operated in the opposite direction, a retraction of the linkage results, thus bringing the supporting member back into its inoperative position.

In an advantageous embodiment form of the invention, the expansion and retraction motions of the linkage, as caused by the hydraulic drive, occur around three fixed points, that are directly or indirectly defined by the truck frame.

The stabilizer in question comprises a cylinder-piston unit which is connected with a suitable circuit for the hydraulic fluid, such circuit being controlled by at least one valve, preferably operated from the driver's cab. The free end of the cylinder is linked with a first fixed point, such as a pin, while the free end of piston rod is linked with a suitable point on a linkage member whose upper end is linked with the second fixed point. The opposite end of the linkage member is linked with a second linkage member connected with a third member at an articulated joint. This articulated joint carries the supporting foot or leg, and the opposite end of the third member is pivotally connected to the vehicle at a third fixed point.

The first of the linkage members advantageously has a triangular shape, a fulcrum being located in each of the vertices of the triangle.

A truck crane can be conveniently equipped with two pairs of stabilizers according to the invention, i.e., a fore pair and a rear pair, being thus the possibility given to operate at will the left stabilizers or the right stabilizers, i.e. on the side where the tilting moment is exerted.

In practice, each stabilizer includes three pairs of linkage members instead of three single linkage members.

Figure 2:
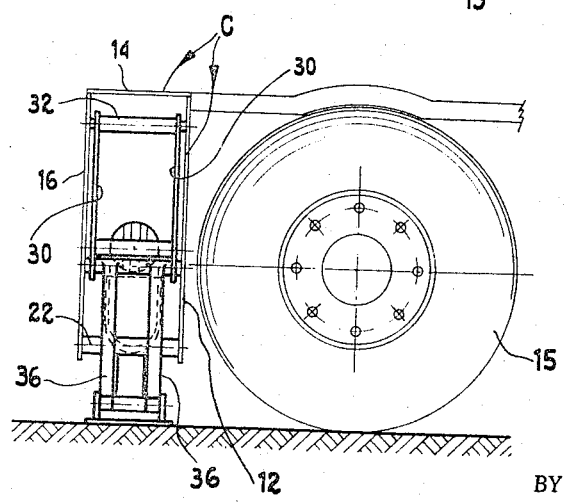

The above and further features of the invention will be now disclosed in the following detailed description, taken with the accompanying drawings, both the description and the drawings being given as a not restrictive example only. In the drawing:

FIG. 1 is a diagrammatic view of the rear side of a truck crane, equipped with two pairs of stabilizers according to the invention, and of which the rear one only is shown, the right linkage being in an expanded position, while the left likage is shown in its retracted position; and FIG. 2 is a diagrammatic side view of same truck crane, as seen in the direction of arrow X in the FIG. 1.

Referring now to the drawing, A is a truck crane, B is the revolving turret, fitted with the jibs on which the sling hooks are suspended, and 10 is a plate fastened to the rear end of the truck crane frame and to which the casing C is rigidly secured, this casing being designed to accommodate the pair of stabilizers D–D' according to the invention. Casing C essentially comprises a first wall 12, perpendicular to the longitudinal symmetry axis of the truck crane, a top wall 14 perpendicular to wall 12, and a third wall 16 parallel to wall 12, the two stabilizers D–D' being fitted between the walls 12–16.

A further pair of stabilizers, similar to stabilizers D–D', is fitted in the fore end of the truck frame.

Each stabilizer comprises a cylinder-piston unit F–F' and a linkage G–G', the leg or foot 18, 18', designed to rest on the ground being connected to a suitable point of the linkage.

The end 20 of cylinder 11 is linked with the pin 22, representing the first fixed point of the device, this pin being secured to plates 12–16, while the free end 24 of piston 26 is linked with the pin 28, which is spatially movable. Pin 28 is secured in corresponding vertices of linkage members 30 which are in the shape of a triangle, and are connected with one another by the linkage pins. The upper vertices of members 30 are linked with the second fixed point 32 of device, comprising a pin having both ends secured to the plates 12–16, while the lower vertices of members 30 are linked with the spatially movable pin 34, with which the upper ends of linkage members 36 are also linked. The pair of members 36 converges, along with the pair of linkage members 38, to spatially movable common pin 40, with which the foot 18 is linked. The opposite ends of members 38 are linked with the third fixed point 42, comprising a pin secured to plates 12–16.

The cylinder 11 of unit D is connected with a hydraulic oil circuit including a delivery pipe and a return pipe, and controlled by a suitable valve, preferably fitted in the truck driver's cab.

Obviously, what is stated above about the stabilizer D on the right side, also holds for the stabilizer D' on the left side, the end 20' of cylinder of the latter stabilizer being linked with the same pin 22 with which the cylinder 11 is linked. Thus, in the considered case, both stabilizers D–D' are symmetrically located with respect to the longitudinal middle plane of the truck crane.

From the foregoing, the operation and performance of the described stabilizers are apparent, and can be resumed as follows.

Referring again to FIG. 1, linkage G of stabilizer D is in its expanded position, with the foot 18 resting on the ground, while the linkage G of stabilizer D' is in its retracted or inoperative position, since in this case the crane jib is designed to lift a load at the right side of the truck, i.e. the side wherefrom the linkage G has been expanded.

To expand stabilizer D, the cylinder-piston unit F is controlled by the operator or truck driver in such a manner that piston 26 is forced outwardly, thus acting on the pin 28. Thereby the pair of linkage members 30 have been swung, through a given angle around the pin 32, in the direction of arrow Y, while unit F has been proportionally swung around pin 22, in the direction of arrow U. Consequently, the pair of linkage members 36 has been swung around the movable pin 34 in the direction of arrow V. Thereby foot 18 has been brought from its lifted, inoperative position, down to its operative position, i.e. with its face 13 into contact with the ground. Obviously, the pair of linkage members 38, has been swung, in the course of said expanding motion, around fixed pin 42, in the direction of arrow Z. Thus, at the end of the motion of the hydraulic control means, the final expanded position of the linkage is attained, with consequent stabilization of the truck crane toward the related direction.

When the linkage is to be retracted, the hydraulic drive unit is controlled by the driver in such a manner as to cause the piston 26 to be moved back into its cylinder 11, whereby the foot 18 is lifted from the ground, while the various members of linkage G are swung around pins 32, 34, 42 in directions opposite to the abovestated ones, and the unit F is swung around pin 22 in a direction opposite to that of arrow U.

Obviously, both the stabilizer D' and the fore stabilizers can be operated in the very same manner as described for the stabilizer D, by acting on the related hydraulic circuit control valve, and the case may also occur wherein all the four stabilizers are required to be simultaneously expanded, and with their feet resting on the ground.

From an operative viewpoint, it is very important that no thrust is transmitted from the feet to the stabilizer cylinders, since the linkage acts as a supporting stay, thus taking-up all the loads.

As it can be readily appreciated, by using stabilizers equipped with the above-described hydraulic drives and linkages, a truck crane can be stabilized in an easy and safe manner, without any manual intervention of the operator. Moreover, the reliability of stabilization is ensured by the simplicity of design of the stabilizers, which further allows the feet to be adjusted in a vertical direction, since the stroke of the pistons can be adjusted within given limits. It is thus possible to bring the feet to rest on the same level as wheels 15, or on different levels.

While the invention has been described with some detail, it is to be understood that the description is for the purpose of illustration only, and is not definitive of the limits of the inventive idea. The right is reserved to make such changes in the details of construction and arrangement of parts, as will fall within the purview of the attached claims.

What I claim is:

1. In an extensible outrigger mechanism for lateral stabilization of a vehicle mounted crane, and of the type including an upper link pivotally connected at one end to a first fixed point of the vehicle frame, a lower link pivotally connected at one end to a second fixed point on the vehicle frame, a third link pivotally connected at its opposite ends to the other ends of said upper and lower links, a ground engaging pad pivotally connected to said lower and third links at the pivotal interconnection thereof, and hydraulic cylinder means, including a cylinder and a piston displaceable in said cylinder, pivotally connected at one end to a third fixed point on the vehicle frame and at the other end to said upper link, said hydraulic cylinder means being operable to expand and retract said mechanism to respectively lower and raise said pad; the improvement in which the pivotal connection between said hydraulic cylinder means and said upper link is intermediate the ends of said upper link and laterally offset from the line joining the two pivot axes of said upper link; the pivotal connection of said hydraulic cylinder means to said vehicle frame being at a level lower than the pivotal connection of said hydraulic cylinder means to said upper link by a distance such that, as said mechanism approaches its extended position wherein said upper and third links are substantially aligned, the axis of said cylinder means forms a substantially right angle with the line joining the pivotal connection of said upper link to the vehicle frame and the pivotal connection of said hydraulic cylinder means to said upper link.

2. In an extensible outrigger mechanism, the improvement claimed in claim 1, in which said upper link is triangular and the respective pivotal connections thereof are located at the vertices of the triangle.

3. In an extensible outrigger mechanism, the improvement claimed in claim 1, in which said mechanism is arranged to be extended from one side of the vehicle; and a second identical mechanism arranged to be extended from the opposite side of the vehicle; the two hydraulic cylinder means being pivotally connected to the vehicle frame at a common point.

4. In an extensible outrigger mechanism, the improvement claimed in claim 1, in which the pivotal connection of said hydraulic cylinder means to the vehicle frame is positioned substantially at the same level as the pivotal connection of said lower link to the vehicle frame.

References Cited

UNITED STATES PATENTS 3,100,049   8/1963   Garnett _____ 212—145
3,144,138   8/1964   Brown et al. _____ 212—145

ANDRES H. NIELSEN, *Primary Examiner.*